March 29, 1960 N. RIEDEL 2,930,259
STARTER-GENERATOR FOR AN INTERNAL COMBUSTION ENGINE
Filed Dec. 7, 1953 3 Sheets-Sheet 2
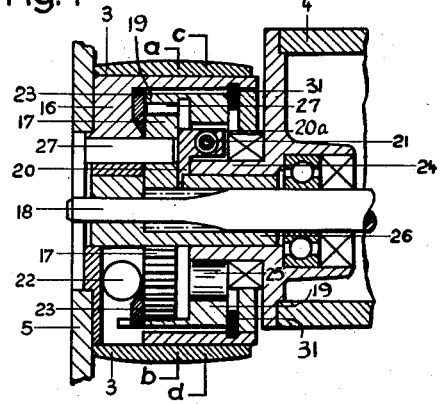
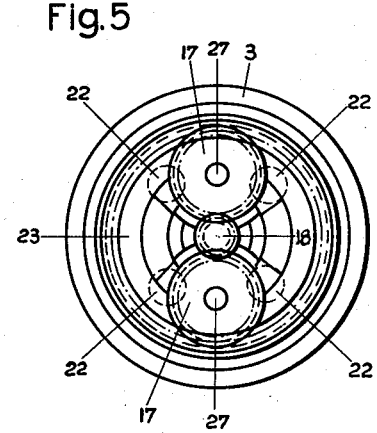
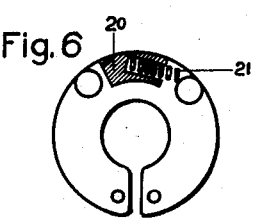
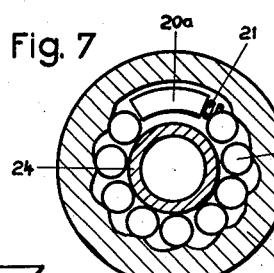
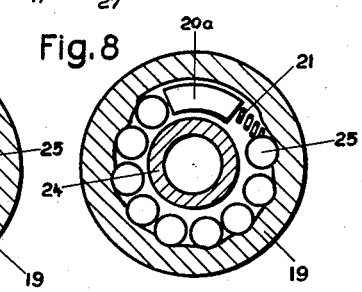
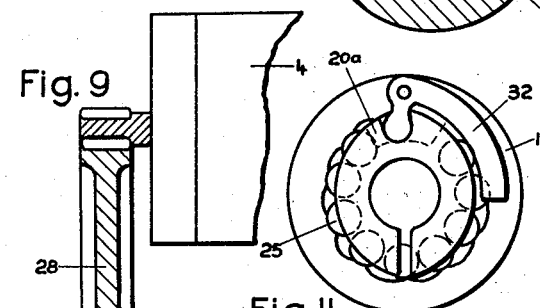
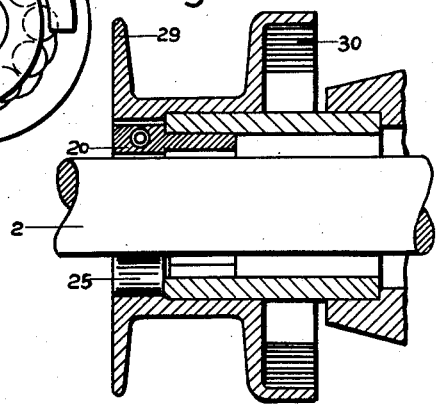
INVENTOR.
NORBERT RIEDEL.
BY Paul M. Craig, Jr.
ATTORNEY.

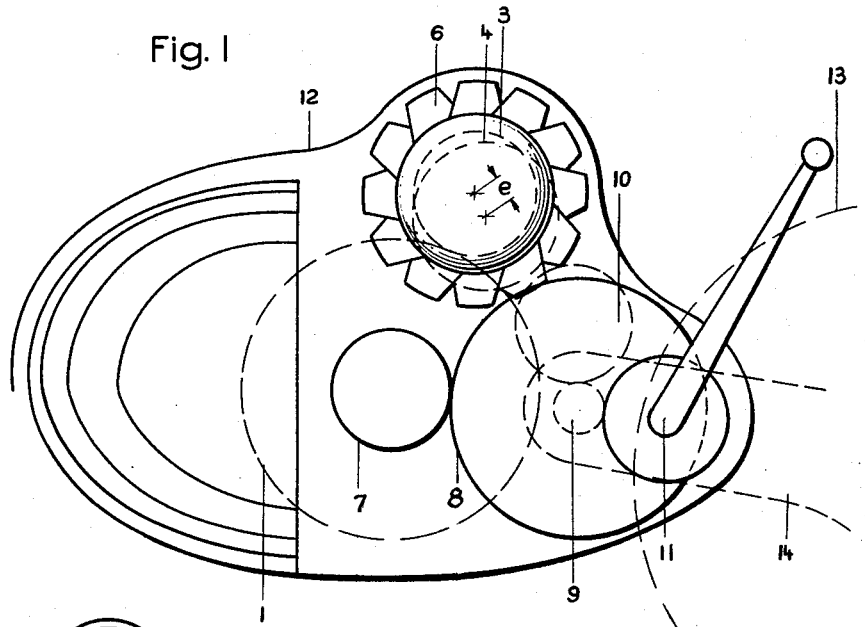
Fig. 1
Fig. 3
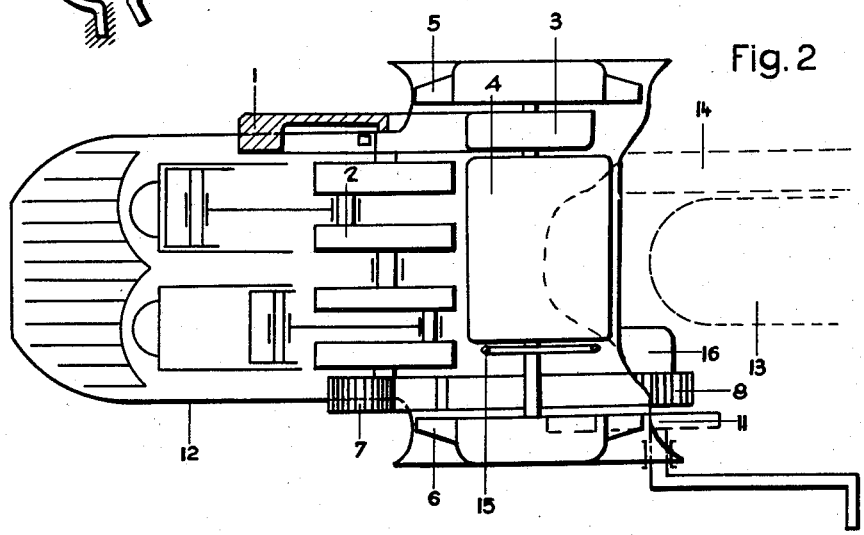
Fig. 2
INVENTOR.
NORBERT RIEDEL.
BY ATTORNEY

March 29, 1960 N. RIEDEL 2,930,259
STARTER-GENERATOR FOR AN INTERNAL COMBUSTION ENGINE
Filed Dec. 7, 1953 3 Sheets-Sheet 3

INVENTOR
NORBERT RIEDEL.

BY *Paul M. Craig, Jr.*

ATTORNEY

United States Patent Office 2,930,259
Patented Mar. 29, 1960

2,930,259

STARTER-GENERATOR FOR AN INTERNAL COMBUSTION ENGINE

Norbert Riedel, Lindau, Bodensee, Germany

Application December 7, 1953, Serial No. 396,551

Claims priority, application Germany December 5, 1952

12 Claims. (Cl. 74—810)

The invention relates to an engine for vehicles which is equipped in known manner with a starter-dynamo and which, by the special arrangement of the auxiliary aggregates such as hand or kick starting device and fan, in combination with a novel freewheeling device or gear, takes into consideration the requirements particularly of two-wheeled vehicles.

The category of two-wheeled vehicles has been considerably enlarged by the motor scooter type. By the arrangement of the different auxiliary aggregates according to the invention, a driving aggregate is produced which meets the requirements for installation on motor scooters, but which can also be used advantageously in the same form for motor cycles.

It is known to arrange the starter-dynamo or starter-generator as an independently mounted machine parallel to the main shaft of the engine. It is likewise known to combine the cooling fan with the starter-dynamo and to employ a friction drive, such as a V-belt, for the drive. Friction gears are also known which utilize the torque produced in the driving parts to increase the frictional force. Finally, automatic change-over devices are known which render it possible to change automatically the transmission ratio from the starter-dynamo to the engine according to whether the auxiliary aggregate operates as a starter or as a dynamo or generator. Hitherto these change-over devices were only available in very complicated construction, and in addition they were open to the objection that they were not sufficiently reliable.

According to the invention a novel change-over gear or device is used, which is fitted in a friction roller on the axle of the starter-dynamo. This small and simple change-over gear enables the auxiliary aggregates already enumerated to be arranged in a particularly practical manner.

Several embodiments of the invention are illustrated in the accompanying drawings, in which:

Fig. 1 shows the vehicle engine in side elevation,

Fig. 2 is a top plan view of Fig. 1,

Figure 12:
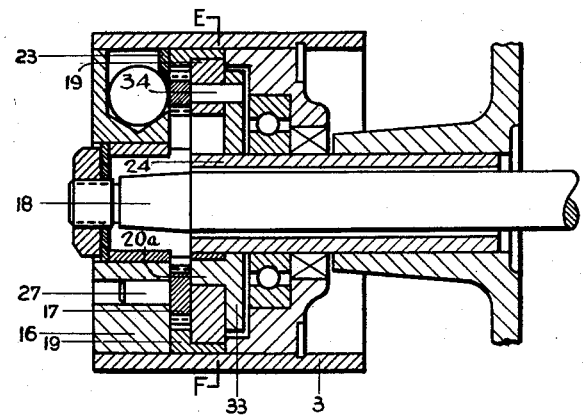
Figure 13:
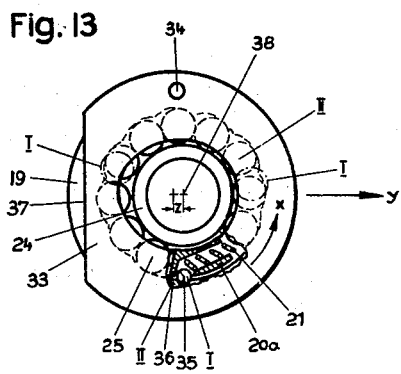

Fig. 3 illustrates a spring for producing the pressing-on pressure when driving the dynamo, Fig. 4 is a longitudinal section through the change-over gear fitted in the driving roller of the dynamo-starter, Fig. 5 is a cross-section through the gear taken on line a—b of Fig. 4, Fig. 6 is a view of the spring or expanding ring seen in the direction c—d of Fig. 4, Fig. 7 is a cross-section through the free-wheel arrangement in gripping position, Fig. 8 shows the freewheel arrangement in freewheeling position, Fig. 9 illustrates a form of construction of the freewheel arrangement, without change-over, as clutch only for a starter, Fig. 10 shows a form of construction of the freewheel arrangement in combination with a hand starting device such as belt starter, Fig. 11 shows another form of construction of the freewheel arrangement with centrifugal control, Fig. 12 is a modified form of construction for actuating the grip roller freewheel, and Fig. 13 is a section on line E—F of Fig. 12.

In the subject matter of the invention it has been recognized that the auxiliary aggregates—starter, dynamo or generator and fan—require the highest possible speed, and this knowledge has been utilized to advantage in the combination of these auxiliary aggregates. To obtain a favourable distribution two fans are provided which are arranged one on each side of the engine. The drive of these combined auxiliary aggregates is effected by a friction roller which is pressed against the flywheel mounted on the crankshaft of the engine.

This arrangement is illustrated in Figs. 1 and 2. The gyrating mass of the flywheel 1 mounted on the crankshaft 2 drives the friction roller 3 of the starter-dynamo 4, on the two sides of which the fan wheels 5 and 6 are arranged.

The term "starter-dynamo device" is used herein and in the claims to designate a rotating electrical machine which is capable to operate both as starter or motor to start the engine, on the one hand, and as generator or dynamo, on the other, to supply electricity to the various electrical devices of the vehicle. The employment of the auxiliary aggregate both as a starter and also as a dynamo makes an automatic change of transmission ratio from the auxiliary aggregate to the engine necessary. An important component of the invention is an automatic arrangement of this kind which is accommodated directly in the driving roller 3.

Fig. 4 shows a longitudinal section through the driving roller with automatic change speed gear. This change speed gear consists primarily of a sun-and-planet gear arrangement. The sun wheel 18 is milled into the shaft of the starter-dynamo. The journal pins 27 of the planet pinions 17 are pressed into the pinion cage 16. A sleeve 26 is also pressed into this pinion cage 16 and serves as bearing for the pinion cage 16 both in the cover 24 of the starter housing and also on the shaft 18. This sleeve 26 has milled-out portions into which the planet pinions 26 project. The outer wheel or ring gear 19 is rotatably supported in the pinion cage 16 and carries a freewheeling arrangement consisting of a ring of rollers 25 and an expanding ring 20 carrying a spring 21. The expanding ring is shown in Fig. 6. The operation of the freewheeling arrangement is illustrated in Figs. 7 and 8. The resilient expanding ring 20 produces by its expansion or spring effect frictional contact with the sleeve 26 pressed into the pinion cage 16. The spring 21, which is located in the projection 20a extending into the ring of rollers 25, spreads the rollers apart so that they bear against the freewheeling cam surfaces formed on the extended portion of the outer wheel or ring gear 19. If the outer wheel or rim is turned in clockwise direction (Fig. 7) the ring of rollers is shifted by the clamping effect of the expanding ring 20 towards the narrowing cam faces and tightly grips the hollow shaft 24 which is rigidly connected with the housing cover of the starter-dynamo. If the outer wheel or ring gear 19 is turned in counter-clockwise direction (Fig. 8), the procedure is reversed and the ring of rollers 25 releases the hollow shaft 24 entirely under the frictional contact of the expanding ring 20 and the action of the spring 21. By this arrangement the freewheeling device is positively blocked and the sun-and-planet change speed gear becomes operative when the auxiliary aggregate is driven as starter. When overrunning takes place, i.e., when the engine starts up, the direction of transmission of force changes and the ring of rollers has no mechanical contact, which is an important factor at the high number of revolutions necessary.

When the starting up procedure is terminated and the sun-and-planet gear becomes inoperative, it is necessary to couple the friction roller 3 with the shaft of the combination aggregate now acting as dynamo. This is also attained by very simple means. The pinion cage 16 has radial bores which accommodate balls 22. When the engine of the vehicle starts up, the number of revolutions of the pinion cage 16 and therefore of the balls 22 increases in relation to the starting procedure about three to four-fold and at the same time the centrifugal force increases with the square of the number of revolutions. The balls 22 then act by their centrifugal force on a conical surface of the disk 23 and the axial component produced by the balls presses the outer wheel or ring gear 19 parallel to the axle of the starter-dynamo against the spring washer 31 and the friction contact produced by the centrifugal force between the outer wheel, on the one hand, and the disk 23, spring washer 31 and the pinion cage 16, on the other hand, is sufficient to transmit the torque necessary for driving the dynamo. Thus the relative speed or movement between the sleeve 26 and the outer wheel 19 is eliminated so that at the same time the expanding ring 20 ceases to slide on the sleeve 26.

Another advantage of the invention is that the pressure exerted by the friction gear or the friction roller 3 on the flywheel 1 is automatically changed. For this purpose the axle of the starter-dynamo is arranged eccentrically to the housing 4 and the housing 4 is rotatably mounted on the housing of the engine. The spring 15 (Fig. 3) engages at one end in the engine housing whereas its other end engages in the dynamo housing 4. Its elasticity produces torque on the dynamo housing so that, on account of the eccentricity (Fig. 1) the roller 3 is pressed against the flywheel 1 with sufficient force to produce the frictional connection when driving the aggregate as a dynamo. If the aggregate is driven as a starter, the sun-and-planet gear operates in the manner above described and produces a force of reaction which is transmitted by the freewheeling clutch to the hollow shaft and the cover 24 of the starter dynamo. This force of reaction is also utilized to amplify by the lever action e the pressure pressing the friction roller against the flywheel.

Figs. 9 and 10 serve to show that the use of the freewheeling clutch in the manner already described is by no means confined thereto. When using starter and dynamo as separate aggregates the freewheeling clutch in the same simple form, can be used for the starter. If the pinion of the starter 4 engages with the wheel 28 (Fig. 9) the same effect can be obtained merely because the wheel 28 is provided with freewheel cam tracks within which the roller ring 25 and the expanding ring 20 are located.

Fig. 10 shows the use as a hand starter. The freewheel tracks are similarly constructed in the driving roller or pulley 29 which in this case is equipped with a return spring 30. In both cases the necessary power for operating the freewheel is produced, as already described, by friction between the expanding ring and the engine housing or a bearing sleeve. By way of amplification, it may be mentioned that it is also possible to use the freewheeling clutch above described, in change-speed gears.

It is also mentioned that the arrangement of the auxiliary aggregates in the manner shown in Figs. 1 and 2 permits of particularly narrow construction owing to the fact that the friction drive is on one side of the engine and the drive for the gear by the pinion 7 and wheel 8 on the main gear shaft are on the other side; the dynamo 4 is located between these drives and the fans 5 and 6 are on the outer side. Air admission into one side of the engine housing effected by fan 5 is opposed to air admission at the other side of the housing by means of fan 6 and, besides contributing to a most desirable saving in space particularly in the case of engine cowling (motor scooters), is particularly advantageous because the cooling air does not enter the cowling. Experience has shown that when cooling air heated by the engine is passed into the scooter cowling, very disagreeable heating up is caused which leads to heating of the fuel in the tank and has a detrimental effect on the batteries, which are mostly arranged under the cowling. The whole arrangement in particular emphasizes the practicability. The gear countershaft 10 is located above the main shaft of the gear, the pinion cage 16 on one side and the drive to rear wheel 14 on the other side of the rear wheel 13. The kick starting device, which may also be necessary, is indicated by the toothed wheel carrying the starter lever 11. Attention is also directed to another possible development. As the fan 6 is at the other end of the dynamo and is driven by the dynamo shaft, it appears possible that when the shaft is driven as starter the fan will take up too much of the starting power. It is then obviously possible to equip also the fan with a simple centrifugal clutch as described, so that the fan will be connected up only when the engine attains a certain speed.

In addition, the form of construction of the freewheeling arrangement shown in Fig. 11 is mentioned. The ring of rollers 25 is in this case operated, not by a frictional contact, but by centrifugal force. For this purpose a flyweight 32 is mounted on the outer wheel 19, which is provided with the freewheel cam tracks, the flyweight being oscillatable on a pivot pin. Under the action of centrifugal force, the rollers 25 can either be brought into gripping position by the flyweight 32 or can be lifted off the shaft.

Whereas in the form of construction illustrated in Figs. 6 to 8 the clamping or gripping roller freewheel mechanism is actuated with the aid of an expanding ring 20 mounted with frictional connection on the shaft, and in the form of construction shown in Fig. 11 the gripping roller freewheel mechanism is actuated by a centrifugal weighted lever 32, Figs. 12 and 13 show yet another very practical form of construction. In this case the gripping roller freewheel mechanism is actuated by an oscillatably suspended disk which on the one hand brings the freewheel rollers into their gripping position by its mass moment of inertia and on the other hand causes by counter rotation the rollers to move into the freewheeling position under the action of centrifugal force. Thus one element of simple construction is allotted two functions, the utilization of the mass moment of inertia as means for engaging the freewheel movement being a particulalry skilful solution.

From Fig. 12, which like Fig. 4 is a longitudinal section through the friction roller 3 with built-in gear, and from Fig. 13, which is a cross-section on line E—F of Fig. 12, it can be seen that the disk 33 is oscillatably suspended on the outer rim of the freewheel mechanism. For this purpose it pivots on a pin 34 fixed in the part of the outer wheel 19 forming the outer rim of the freewheel mechanism. The disk 33, like the above mentioned actuating elements (expanding ring 20 and centrifugal lever 32), has a projection 20a extending into the ring of rollers 25 and carries the freewheel spring 21. This spring acts at one end on the adjacent roller 25 and at its other end on an additional roller 35 slidably let into the projection 20a. If the rollers are in the free position I, shown in dot-dash lines in Fig. 13 and the outer wheel 19 turns in the direction of the arrow x, the mass moment of inertia of the oscillatable disk 33 causes a relative counter movement which is transmitted by the projection 20a to the gripping rollers 25 with the result that these rollers are pressed into the gripping position II shown in full lines, wherein the additional ball 35 enters the cup 36 provided in the outer rim. Now to ensure that during the overrunning or overtaking procedure, that is when the shaft is driven by the engine, the gripping position is reliably released and all the rollers are positively lifted from the hollow shaft 24, the centrifugal force produced by the same oscillatable disk 33 is utilized. For this reason the disk 33 is flattened on one side at 37. In addition to this construction, which makes the disk 33 eccentric, it may also be arranged eccentrically to the axis of the shaft 38, for example with the eccentricity $z$. Therefore during the overrunning operation a centrifugal force acting in the direction $y$ is produced which is transmitted by the projection 20a to the ring of rollers 25 with the result that the rollers move into the freewheeling position I.

I claim:

1. In a vehicle engine, especially for two-wheeled vehicles, a starter-dynamo device having a shaft member operatively connected with said engine at different transmission ratios depending on whether the starter-dynamo device is actually operated as starter or dynamo comprising friction roller means, automatically operated change-speed gear means, said friction roller means being disposed between said engine and said change-speed gear means, and means for driving the shaft member of said starter-dynamo device during operation thereof as a dynamo by the vehicle engine through said friction roller means and at the same speed as said friction roller means, and means for driving said engine by said starter dynamo device during operation thereof as a starter through said friction roller means and said automatically operated change-speed gear means whereby said shaft and said friction roller means rotate at different speeds.

2. The combination according to claim 1, wherein said change speed gear means consists of a planetary gearing arrangement built into said friction roller means, and further comprising one-way freewheeling means with rollers for automatically operating said change speed gear means in dependence of the operation of said device as dynamo or starter.

3. The combination according to claim 2, wherein said freewheeling means includes an expanding ring in frictional contact with the shaft of the engine, and wherein the rollers of said freewheeling means form a ring, and means including a spring for actuating the ring of rollers by said expanding ring.

4. The combination according to claim 2, further including an eccentrically positioned centrifugally actuated lever and a spring for actuating the rollers of said freewheeling means.

5. The combination according to claim 1, wherein said starter-dynamo device includes a shaft, and further comprising a centrifugally operated coupling means operatively connected with said change speed gear means for coupling said friction roller with the shaft of said device, said coupling means including a conically shaped wedging surface to produce an axial coupling pressure.

6. The combination according to claim 5, wherein said change speed gear means includes a planet carrier, and said coupling means includes a conically-shaped axially-displaceable disk member, and centrifugally movable rollers cooperating with said disk member to produce said axial coupling pressure.

7. The combination according to claim 1, further comprising a driving element for said friction roller means, means for producing a pressure to press said friction roller means against said driving element, means for automatically changing the pressure pressing said friction roller means against said driving element including a housing for said device arranged eccentrically to the engine shaft, and rotational torque producing spring means acting on said housing to produce the driving pressure by said torque during operation of said device as dynamo and to amplify the same by the reaction moment of said change speed gear means.

8. In a vehicle engine as set forth in claim 1, wherein said change-speed gear means includes a sun-and-planet gear fitted in the friction roller means, and wherein said friction roller means includes a gripping roller freewheeling mechanism cooperating with said sun-and-planet gear to engage and disengage the dynamo and starter device, said freewheeling mechanism comprising a spring-loaded ring of rollers, and an expanding ring mounted with frictional connection on the driving shaft and controlling said ring of rollers.

9. In a vehicle engine as set forth in claim 1, wherein said change-speed gear means includes a sun-and-planet gear fitted in the friction roller means, and wherein said friction roller means includes a gripping roller freewheeling mechanism cooperating with said sun-and-planet gear to engage and disengage the starter and dynamo device, said freewheeling mechanism comprising a spring-loaded ring of rollers, and an eccentrically mounted centrifugal lever controlling said ring of rollers.

10. In a vehicle engine as set forth in claim 1, wherein said change-speed gear means includes a sun-and-planet gear fitted in the friction roller means, and wherein said friction roller means includes a gripping roller freewheeling mechanism cooperating with said sun-and-planet gear to engage and disengage the starter and dynamo device, said freewheeling mechanism comprising a spring-loaded ring of rollers and an oscillatable disk mounted on the outer rim of the freewheeling mechanism formed by the outer wheel of the sun-and-planet gear, adapted by its mass moment of inertia to shift said rollers into operative position on the rotation of said outer rim.

11. In a vehicle engine as set forth in claim 1, wherein said changer-speed gear means includes a sun-and-planet gear fitted in the friction roller means, and wherein said friction roller means includes a gripping roller freewheeling mechanism cooperating with said sun-and-planet gear to engage and disengage the starter and dynamo device, said freewheeling mechanism comprising a spring-loaded ring of roller and an eccentric disk oscillatably mounted on the outer rim formed by the outer wheel of the sun-and-planet gear adapted by centrifugal force acting in a direction perpendicular to the dead-center line of oscillation to bring said rollers into freewheeling position.

12. In a vehicle engine, especially for two-wheeled vehicles, a starter-dynamo device having a rotatable shaft member operatively connected with said engine at different transmission ratios depending on whether the starter-dynamo device is actually operated as starter or dynamo comprising friction roller means, automatically operated change-speed gear means, and means for driving the shaft member of said starter-dynamo device during operation thereof as a dynamo by the vehicle engine through said friction roller means, said friction roller means being coaxial of said shaft member and connected between said engine and said change-speed gear means, and means including said change-speed gear means and said friction roller means for driving said engine by said starter-dynamo device during operation thereof as a starter.

References Cited in the file of this patent

UNITED STATES PATENTS

| | | |
|---|---|---|
| 1,235,046 | Nikonow | July 31, 1917 |
| 1,955,475 | Sorensen | Apr. 17, 1934 |
| 2,108,384 | Moisy | Feb. 15, 1938 |
| 2,562,568 | Nardone | July 31, 1951 |
| 2,682,788 | Dalyrymple | July 6, 1954 |

FOREIGN PATENTS

| | | |
|---|---|---|
| 298,519 | Great Britain | Mar. 28, 1928 |
| 781,657 | France | Feb. 25, 1935 |